March 13, 1956 R. J. HARASEK 2,738,419

RADIO RECEIVER APPARATUS

Filed July 26, 1952

INVENTOR.
Richard J. Harasek,
BY
Forman L. Mueller
Atty.

United States Patent Office 2,738,419

Patented Mar. 13, 1956

2,738,419

RADIO RECEIVER APPARATUS

Richard J. Harasek, Chicago, Ill., assignor to Motorola, Inc., Chicago, Ill., a corporation of Illinois Application July 26, 1952, Serial No. 301,069

5 Claims. (Cl. 250—16)

This invention relates to radio receivers, or the like; and more particularly to an improved construction for a radio receiver of the inexpensive, miniature type.

It has long been considered desirable to utilize printed circuit techniques in the fabrication of radio receivers due to the increased manufacturing efficiency and resulting decrease in cost that can be achieved thereby. However, the use of printed circuits in radio receivers, and particularly in the miniature type where they are especially needed, has presented several problems.

To facilitate the printing process, it is desirable to use an insulating panel as a chassis, and imprint each side thereof with an electrical circuit and, for purposes of economy, this panel must be as thin as possible. This precludes the use of the sturdy metal chassis presently incorporated in most types of radio receivers, and difficulties have been encountered in mounting the aforementioned panel in a miniature receiver in an appropriate fashion so that the various electrical elements can be mounted in a sufficiently spaced relation to be properly interconnected by the imprinted circuit. Difficulties have also been encountered in mounting the heavier elements of the receiver, such as the tuning condenser, on such a thin panel without producing undue strain on the panel, and damage to the circuit imprinted thereon.

It is an object of the present invention to provide an inexpensive radio receiver or the like that is constructed in a new and improved fashion so as to be relatively small and compact.

Another object of the invention is to provide an improved radio receiver which is constructed to utilize efficiently a printed circuit base panel so that it may be manufactured expeditiously and economically.

Yet another object of the invention is to provide an improved small and compact radio receiver which is constructed to have tonal qualities comparing favorably with the reproduction capabilities of larger, more expensive, receivers.

A feature of the invention is the provision of a miniature radio receiver which includes a molded shell with a thin insulating panel supported therein in spaced parallel relation with its front wall. The various electrical elements of the receiver are mounted on the panel of the side thereof remote from the front wall, and an electrical circuit interconnecting these elements may be imprinted directly on both sides of the panel. To remove the strain from the panel of the heavier elements mounted thereon, an improved mounting arrangement is provided so that such elements are, in effect, supported by pedestals extending from the front wall of the shell rather than by the panel.

Another feature of the invention is the provision of a baffle plate, which is mounted on the exterior of the aforementioned shell in spaced, parallel relation with a speaker aperture in the front wall, and which forms a resonant chamber with portions of the front wall surrounding the apertures to improve the tonal qualities of the receiver.

The above, and other features of the invention, which are believed to be new are set forth with particularity in the appended claims. The invention itself, however, together with further objects and advantages thereof may best be understood by reference to the following description when taken in conjunction with the accompanying drawing in which:

Figures 1, 2, 3, 4:
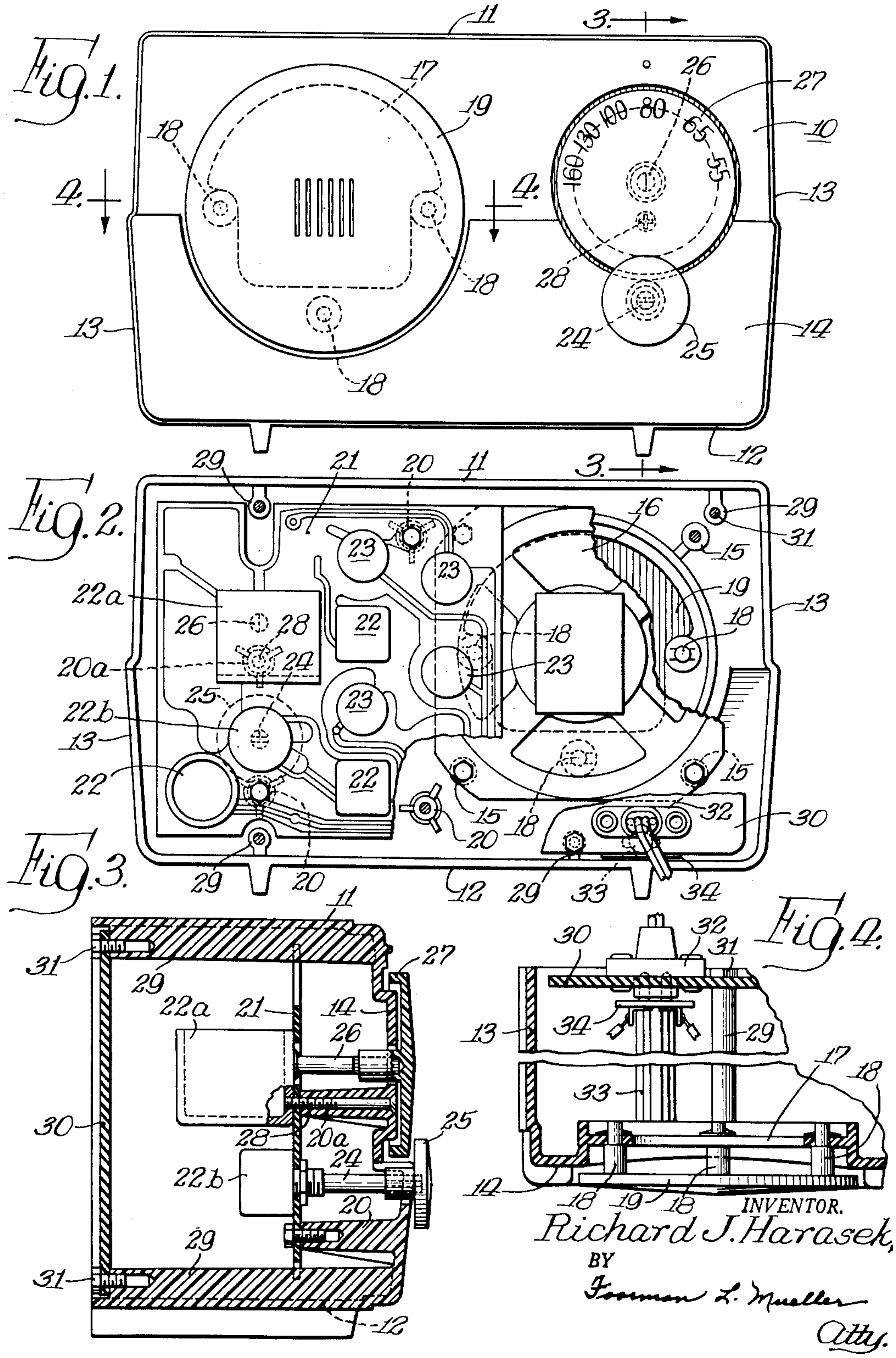
Fig. 1 shows a front view of the radio receiver of this invention.
Fig. 2 is a rear view of the receiver with portions thereof broken away to reveal the various components incorporated in the receiver.
Fig. 3 is a sectional view taken along the lines 3—3 of Fig. 1.
Fig. 4 is a sectional view taken along the lines 4—4 of Fig. 1.

Referring now to the drawing, the receiver of the invention includes a cabinet structure 10 comprising a molded shell defining an integral top wall 11, bottom wall 12, side walls 13 and front wall 14. A group of pedestals 15 is formed on the interior of the shell during the molding process, and these pedestals extend rearwardly from the front panel 14. A speaker 16 is mounted on pedestal 15 and faces an aperture 17 in the front wall. A baffle plate 19 is supported on a group of pedestals 18 in spaced, parallel relation with the external surface of the front wall facing the above mentioned aperture and defining a resonant chamber with portions of the front wall surrounding the aperture to improve and add to the richness of the tonal qualities of the receiver.

A group of integral pedestals 20 is formed in the interior of the shell during the molding process, and these pedestals extend rearwardly from the front wall 14. A thin insulating panel 21 is mounted on the latter pedestals in spaced, parallel relation with the front wall. The insulating panel, in a preassembly operation, has a plurality of electrical elements 22 mounted therein and also has sockets formed therein to receive electron discharge devices 23. The sockets and electrical elements may be interconnected by an electrical circuit imprinted directly on panel 21, for example, by the process disclosed and claimed in copending application Serial No. 297,285, entitled Electroplating Process, filed July 5, 1952, in the name of Temple Nieter. One of the electrical elements 22 may, for example, be the volume control **22*b* of the receiver, and it is mounted with its control shaft 24 extending through an aperture in panel 21 and through an aperture in front wall 14 to engage a control knob 25. Another of the electrical elements 22 may, for example, be the main tuning condenser 22*a* of the receiver and it, likewise, is mounted with its control shaft 26 extending through a hole in panel 21 and through a hole in the front wall to engage a tuning knob 27**.

In order that the relatively heavy tuning condenser **22*a* on panel 21 will not produce an undue strain on the panel, it is mounted directly over one of the pedestals 20 which is indicated 20*a*. Pedestal 20*a* has an aperture extending longitudinally therethrough which receives a screw member 28; the screw member extending through front wall 14 through pedestal 20*a* and into engagement with condenser 22*a*. In this manner, the condenser is securely held against the pedestal so that the strain produced thereby is carried by the pedestal and is removed from panel 21. Therefore, not only is the strain due to the weight of the condenser removed from the base panel, but the added strain produced during assembly or servicing when knob 27 is pushed on or pulled off control shaft 26** is also removed from the panel.

The receiver also includes a group of pedestals 29 integrally formed within the shell during the molding process and extending rearwardly from front wall 14 the entire width of the cabinet, the latter pedestals supporting a back panel 30 which is secured thereto by means of screws 31 or other fastening devices. Back panel 30 has an electrical receptacle 32 mounted thereon into which the energizing cord of the receiver extends.

A pedestal 33 is integrally formed within the cabinet shell during the molding process and extends rearwardly from the front wall to support in its extremity a plug 34 which engages receptacle 32 when the back panel is in place. In this fashion, means are provided for positively deenergizing the set when the back panel is removed for servicing. Pedestal 33 has a clover-leaf cross-section to provide a positive support for plug 34 when receptacle 32 is pushed into engagement. The invention provides, therefore, a radio receiver of the miniature type in which the electrical elements of the receiver are arranged on a thin insulating panel upon which an electrical circuit may be directly imprinted, the panel being supported in a vertical plane to allow maximum separation of the various elements within a restricted cabinet area, and the support of the panel being such that the strain of the relatively heavy tuning condenser is not carried by the panel itself. The receiver also includes a baffle plate which is supported over a speaker aperture in the front wall of the cabinet to form a resonant chamber and enhance the reproduction qualities of the receiver.

While a particular embodiment of the invention has been shown and described modifications may be made and it is intended in the appended claims to cover all such modifications which fall within the true spirit and scope of the invention.

I claim:

1. A radio receiver and the like including in combination, a molded cabinet structure having front, top and a pair of side walls; a group of pedestals formed integral with said front wall and extending rearwardly therefrom a distance less than the width of said side walls; a relatively thin insulating panel supported on said pedestals in spaced, parallel relation with said front wall; a plurality of electrical elements including a relatively heavy element mounted on said panel on the side thereof remote from said front wall; a control shaft for said relatively heavy element extending through an aperture in said panel and through an aperture in said front wall; and a fastening member extending through said front wall, through one of said pedestals, and through said panel into engagement with said relatively heavy element to remove the strain of said element from said panel.

2. A radio receiver and the like including in combination, a molded shell defining integral front, top and bottom walls and a pair of side walls, with said front wall having an enlarged aperture therein; first and second groups of pedestals integrally formed on the interior of said shell and extending rearwardly from said front wall, with said second group being disposed adjacent said enlarged aperture; a relatively thin insulating panel supported on said first group of pedestals in spaced relation with said front wall; a plurality of electrical elements including a relatively heavy tuning element mounted on said panel; control means for said tuning element extending through apertures in said panel and in said front wall; a fastening member extending through one of said first group of pedestals and through said panel into engagement with said tuning element to support the same; a loudspeaker mounted on said second group of pedestals and facing said aperture in said front wall; and a baffle plate supported on the exterior of said front wall facing said aperture and in spaced parallel relation with said front wall to define a resonant chamber.

3. The radio receiver defined in claim 2 and additionally including a further pedestal integrally formed on the interior of said shell and extending rearwardly to the back thereof, an electrical receptacle mounted on the end of said further pedestal adjacent the back of said shell, a back panel, and an electrical connector mounted on said back panel in electrical engagement with said receptacle when said back panel is in place.

4. A radio receiver and the like including in combination, a molded cabinet structure having a front wall, a top wall and a pair of side walls; at least one pedestal formed integral with said front wall and extending rearwardly therefrom a distance less than the width of said side walls; a relatively thin insulating panel supported within said cabinet structure; a plurality of electrical elements including a relatively heavy element mounted on said panel; a control shaft for said relatively heavy element extending through an aperture in said front wall; and a fastening member extending through said front wall and through said pedestal into engagement with said relatively heavy element to remove the strain of such element from said panel.

5. A radio receiver and the like including in combination, a molded cabinet structure having a front wall, a top wall and a pair of side walls; a group of pedestals formed integral with said front wall and extending rearwardly therefrom a distance less than the width of said side walls; a relatively thin insulating panel supported in spaced, parallel relation with one of said walls; a plurality of electrical elements including a relatively heavy tuning element mounted on said panel; a control shaft for said tuning element extending through an aperture in said front wall; and a fastening member extending through said front wall and through one of said pedestals into engagement with said tuning element to remove the strain of such tuning element from said panel.

References Cited in the file of this patent

UNITED STATES PATENTS

| | | |
|---|---|---|
| 2,057,116 | Rubens | Oct. 13, 1936 |
| 2,174,107 | Kenney | Sept. 26, 1939 |
| 2,468,727 | Bauman | May 3, 1949 |
| 2,514,246 | Knox | July 4, 1950 |
| 2,549,021 | Setchell | Apr. 17, 1951 |

FOREIGN PATENTS

| | | |
|---|---|---|
| 120,458 | Austria | Oct. 25, 1945 |